(12) United States Patent
Wang et al.

(10) Patent No.: US 9,747,209 B1
(45) Date of Patent: Aug. 29, 2017

(54) SYSTEM AND METHOD FOR IMPROVED MEMORY PERFORMANCE USING CACHE LEVEL HASHING

(71) Applicant: QUALCOMM INCORPORATED, San Diego, CA (US)

(72) Inventors: Feng Wang, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/054,295

(22) Filed: Feb. 26, 2016

(51) Int. Cl.
G06F 12/08 (2016.01)
G06F 12/0811 (2016.01)
G06F 12/0868 (2016.01)

(52) U.S. Cl.
CPC ...... *G06F 12/0811* (2013.01); *G06F 12/0868* (2013.01); *G06F 2212/1024* (2013.01); *G06F 2212/283* (2013.01); *G06F 2212/313* (2013.01)

(58) Field of Classification Search
None
See application file for complete search history.

(56) References Cited

U.S. PATENT DOCUMENTS

| | | | |
|---|---|---|---|
| 5,713,001 A | 1/1998 | Eberhard et al. |
| 6,289,358 B1 | 9/2001 | Mattis et al. |
| 6,470,442 B1 | 10/2002 | Arimilli et al. |
| 7,290,116 B1 | 10/2007 | Grohoski et al. |
| 8,706,966 B1 | 4/2014 | Kraipak et al. |
| 2014/0006538 A1 | 1/2014 | Oikonomou |
| 2015/0199134 A1 | 7/2015 | Mondal et al. |

OTHER PUBLICATIONS

Tony Givargis, "Zero Cost Indexing for Improved Processor Cache Performance," ACM Transactions on Design Automation of Electronic Systems, Jan. 2006 vol. 11, No. 1, pp. No. 03-25.
International Search Report and Written Opinion—PCT/US2017/015187 —ISA/EPO—Apr. 21, 2017.
Vandierendonck H., et al., "Application-Specific Reconfigurable XOR-Indexing to Eliminate Cache Conflict Misses", Design, Automation and Test in Europe, 2006, Date '06, Proceedings Munich, Germany Mar. 6-10, 2006, Jan. 1, 2006 (Jan. 1, 2006), pp. 1-6, XP055361277, DOI:10.11 09/Date.2006.243736 ISBN: 978-3-9810801 -1-7.

*Primary Examiner* — Kevin Verbrugge
(74) *Attorney, Agent, or Firm* — Smith Tempel Blaha LLC

(57) ABSTRACT

Various embodiments of methods and systems for cache-level memory management in a system on a chip ("SoC") are disclosed. Memory utilization is optimized in certain embodiments through application of customized hashing algorithms at the lower level cache of individual application clients. Advantageously, for those application clients that do not require or benefit from hashing transaction traffic their transactions are not subjected to hashing. For those application clients that do benefit from hashing transaction traffic in order to minimize page conflicts at a double data rate ("DDR") memory device, each client further benefits from a customized, and thus optimized, hashing algorithm. Because transaction streams arrive at the memory controller already hashed, or purposefully unhashed, the need for validating clients during a development phase is minimized.

30 Claims, 5 Drawing Sheets

SYSTEM AND METHOD FOR IMPROVED MEMORY PERFORMANCE USING CACHE LEVEL HASHING

DESCRIPTION OF THE RELATED ART

Portable computing devices ("PCDs") commonly contain integrated circuits, or systems on a chip ("SoC"), that include numerous components designed to work together to deliver functionality to a user. For example, a SoC may contain any number of master components such as modems, displays, central processing units ("CPUs"), graphical processing units ("GPUs"), etc. that are used by application clients to process workloads. In processing the workloads, the master components read and/or write data and/or instructions to and/or from memory components on the SoC. The data and instructions may be generally termed "transactions" and are transmitted between the devices via a collection of wires known as a bus.

As would be understood by one of ordinary skill in the art, master components make use of closely coupled memory devices whenever possible, such as level one ("L1") and level two ("L2") cache devices, because cache devices provide a dedicated means to quickly handle read and write transactions for a given master component. If a read transaction cannot be handled by a cache, the event is termed a "cache miss" and the transaction is forwarded to a memory controller that manages access to a slower, but higher capacity long term memory device, such as a double data rate ("DDR") memory device. Similarly, the data stored in a cache by write transactions from a master component must periodically be flushed to the memory controller for updating and long term storage in the DDR. Notably, while each master component may have the benefit of a dedicated cache memory, the DDR memory device is shared by all master components.

Transactions are most quickly serviced by cache, and so master components may employ index hashing techniques to optimize the use of the inherently limited cache capacity. Even the most efficiently used cache, however, cannot accommodate all the transactions all the time. When the cache cannot service a read transaction, or when data written in the cache is flushed to the DDR to make room in the cache for new data, the master component works with the memory controller to fulfill the transactions at the DDR.

Notably, cache miss transaction streams and write transaction streams emanating concurrently from a master component's last level cache can result in page conflicts at the DDR as both streams compete to access the same DDR memory bank. Page conflicts increase transaction latency, unnecessarily consume power resources, and reduce bus bandwidth availability. To minimize page conflicts, memory controllers known in the art often employ a "one size fits all" DDR bank hashing technique to increase the probability that concurrent read and write transaction streams emanating from a given master component may be accommodated simultaneously from different banks within the DDR.

A shortcoming of a DDR bank hashing technique is that a single hashing algorithm is usually not optimal, or even desirable, for all master components seeking access to the DDR. And so, prior art solutions often rely on a validation procedure during product develop to determine which single hashing technique works best, even though not optimally, for all master components concerned. Notably, because a single hashing technique will inevitably not be optimal for all master components, prior art solutions are prone to unacceptable transaction latencies and less than optimal DDR memory utilization.

Therefore there is a need in the art for a system and method that optimizes DDR memory utilization through the use of multiple cache level hashing techniques that are optimal for associated master components. Moreover, there is a need in the art for a system and method that optimizes transaction latencies by alleviating the need to use a single, one-size fits all DDR level bank hashing scheme.

SUMMARY OF THE DISCLOSURE

Various embodiments of methods and systems for cache-level memory management in a system on a chip ("SoC") are disclosed. In an exemplary embodiment, eligibility for hashing the transaction traffic of one or more application clients is determined. For each of the clients that is determined to be eligible for hashing transaction traffic, a customized hashing algorithm is selected and applied via a cache index hash module to read and write transactions associated with a low level cache. The transactions, having been hashed at the cache level, are directed from the low level cache to a memory controller associated with a multi-bank memory device accessible by a plurality of clients (as opposed to the cache which is accessible by only the one client). Advantageously, the hashed read and write transactions are fulfilled from different banks of the multi-bank memory device, such as different banks of a DDR memory device. In this way, the most optimal hash algorithm for each client may be used for transactions emanating from that client. And, because those clients that do not require or benefit from hashing their transaction traffic are not affected by a cache index hash module, the need for validating the source of the transactions is avoided.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
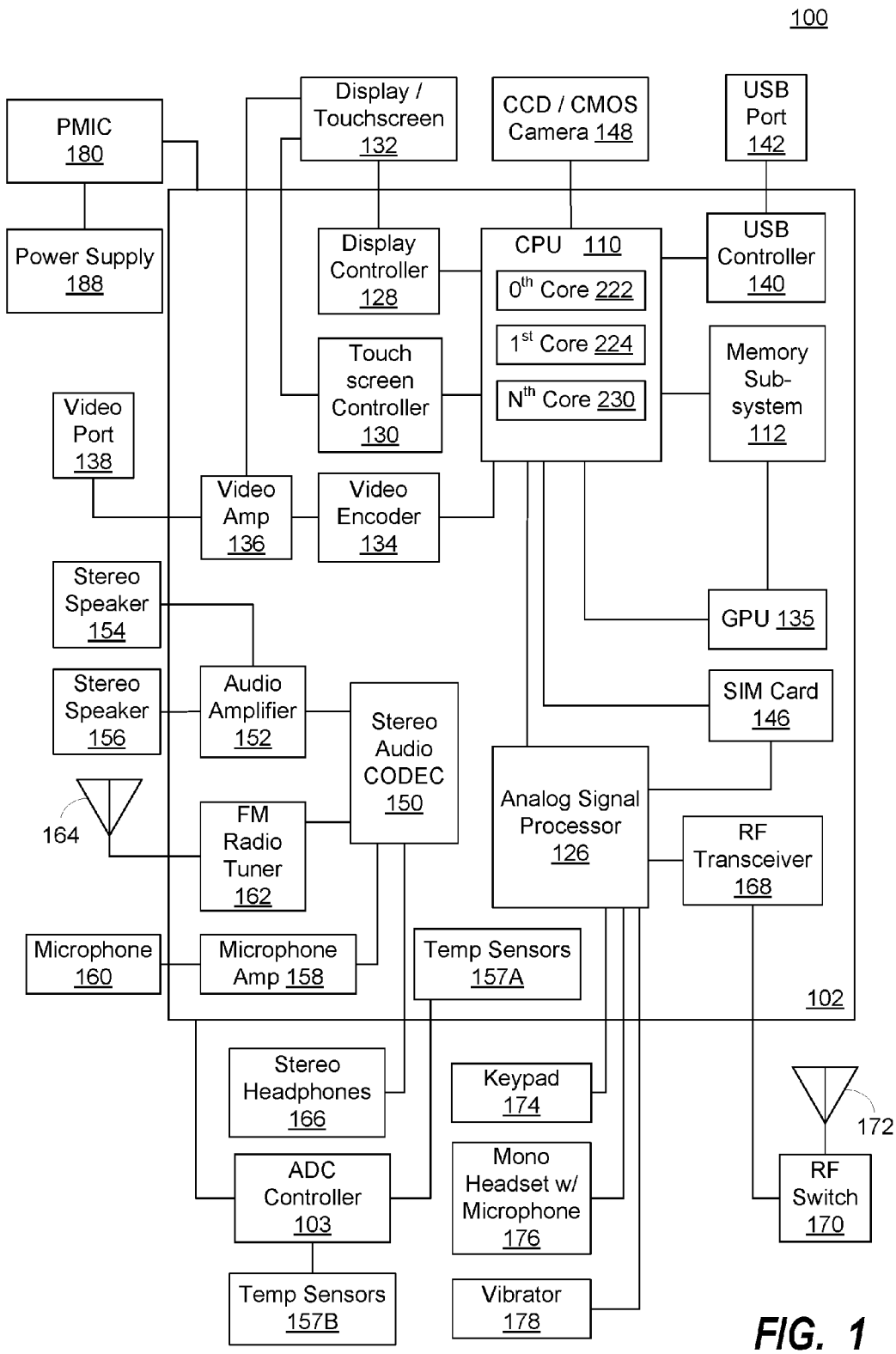
FIG. 1 is a functional block diagram illustrating an exemplary, non-limiting aspect of a portable computing device ("PCD") in the form of a wireless telephone for implementing cache-level memory management ("CMM") systems and methods.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to double data rate "DDR" memory components will be understood to envision any of a broader class of volatile random access memory ("RAM") used for long term data storage and will not limit the scope of the solutions disclosed herein to a specific type or generation of RAM.

As used in this description, the terms "component," "database," "module," "system," "controller," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, the terms "engine," "processing engine," "master processing engine," "master component" and the like are used to refer to any component within a system on a chip ("SoC") that generates transaction requests to closely coupled memory devices and/or to components of a memory subsystem via a bus. As such, a master component may refer to, but is not limited to refer to, a CPU, DSP, GPU, modem, controller, display, camera, etc. A master component comprised within an embodiment of the solution, depending on its particular function and needs, may leverage a customized cache-level hashing technique or, alternatively, may not. For a given master component that does not leverage a customized cache-level hashing technique, it is envisioned that it may comprise dedicated hardware to generate a special transaction traffic pattern particularly suited for that given master component.

In this description, the terms "writeback" and "flush" refer to the process of updating data and/or instructions instantiated in a DDR based on fresher versions of the data and/or instructions that exist in a closely coupled memory (e.g., an L2 cache) associated with one or more master components. One of ordinary skill in the art will understand that data instantiated in a closely coupled memory to a processing component, such a low level L2 cache memory, may have a virtual memory address associated with a memory address in DDR. The DDR memory address may be associated with a certain data bank in the DDR for storing data in either a compressed or decompressed format, as would be understood by one of ordinary skill in the art. Based on the virtual memory address and the presence of a "dirty" bit for data stored in a cache, a memory controller may seek to update DDR, as would be understood by one of ordinary skill in the art. The term "dirty bit" will be understood to be a bit associated with a virtual memory page in a cache that indicates that the data stored in the memory page has been generated anew or modified from its original state by a master component, but not yet written back to DDR. When a writeback transaction to the DDR seeks to update a memory address in the same bank as another memory address which is the target of a read transaction, a page conflict may occur. To mitigate page conflicts, embodiments of the solution leverage cache-level hashing techniques to store data in virtual memory addresses that point to DDR memory addresses in different banks.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component. The term "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In current systems and methods, master components running simultaneously in a PCD create an intermingled flow of read and write transaction requests that necessitate access to dispersed regions of a DDR memory component. Each transaction consumes power and bus bandwidth as compressed and decompressed data are transmitted over a bus and marshaled by a memory controller to and from a DDR component. Consequently, queues of transaction requests seeking to access data in shared regions of the DDR may not only consume unnecessary amounts of power, but also create memory contentions and bus traffic congestion that work to detrimentally increase transaction latencies. Similarly, and as one of ordinary skill in the art would understand, the quality of service ("QoS") experienced by a user of a PCD may suffer when excessive amounts of bandwidth and power capacity are utilized to service transaction requests bound to a DDR.

As one of ordinary skill in the art would understand, master processing components in a shared memory multi-processor system use the memory subsystem to exchange information and perform synchronization. Consequently, memory contention (i.e., page conflicts) associated with multiple read and write transactions seeking simultaneous access to a common bank of the shared memory subsystem may cause QoS to suffer.

Prior art solutions combat memory contention by employing a hashing block at the memory controller in an effort to disperse data storage across multiple banks which may be accessed simultaneously. A read transaction and a write transaction emanating from an L2 cache of a master component may both point to the same DDR bank, but the hashing block of the memory controller works to accommodate both requests from different banks. A problem with employing a hashing block at the memory controller, however, is that the hashing algorithm used may not be optimal for all master components that share access to the DDR. Moreover, because some master components may include specialized traffic pattern generators, applying the hashing algorithm at the memory controller to their particular transaction traffic may be detrimental to their functionality. Consequently, prior art solutions often employ an "extra step" to validate the master component from which a given transaction has emanated before subjecting the given transaction to the hashing block of the memory controller. Such validation steps contribute to bus congestion, power consumption and increased latencies.

Advantageously, embodiments of a cache-level memory management ("CMM") solution avoid hashing and validation at the memory controller by employing dedicated, customized hashing modules at the lower level caches of each master component. For those master components that do not benefit from hashing, no dedicated hashing module may be comprised or, alternatively, a hashing module dedicated to the given master component may be bypassed or "turned off." In this way, competing transactions emanating from a given master component may be associated with virtual memory addresses in the closely coupled cache that already point to different DDR banks when received by the memory controller.

FIG. 1 is a functional block diagram illustrating an exemplary, non-limiting aspect of a portable computing device ("PCD") in the form of a wireless telephone for implementing cache-level memory management ("CMM") systems and methods. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the memory subsystem 112 comprises, inter alia, a memory controller 215, dedicated caches for master components, and a DDR memory 115 (collectively depicted in the FIG. 1 illustration as memory subsystem 112). The memory subsystem 112 in general, and some of its components specifically, may be formed from hardware and/or firmware and may be responsible for cache-level memory management using component-customized hashing methodologies that work to mitigate page conflicts when accessing data and instructions stored in the DDR memory 115. Advantageously, by performing cache-level hashing in the memory subsystem 112, CMM solutions optimize transaction latencies when data is flushed to, or read from, non-volatile memory as well as minimize data traffic on the bus 205 (not shown in FIG. 1) and reduce power consumption on the SoC.

As illustrated in FIG. 1, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136.

As depicted in FIG. 1, a universal serial bus ("USB") controller 140 is coupled to the CPU 110. Also, a USB port 142 is coupled to the USB controller 140. The memory subsystem 112, which may include a PoP memory, a mask ROM/Boot ROM, a boot OTP memory, a DDR memory 115 (see subsequent Figures), caches and customized hashing modules may also be coupled to the CPU 110 and/or include its own dedicated processor(s). A subscriber identity module ("SIM") card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 1 may reside on chip 102 in other exemplary embodiments.

Figure 4:
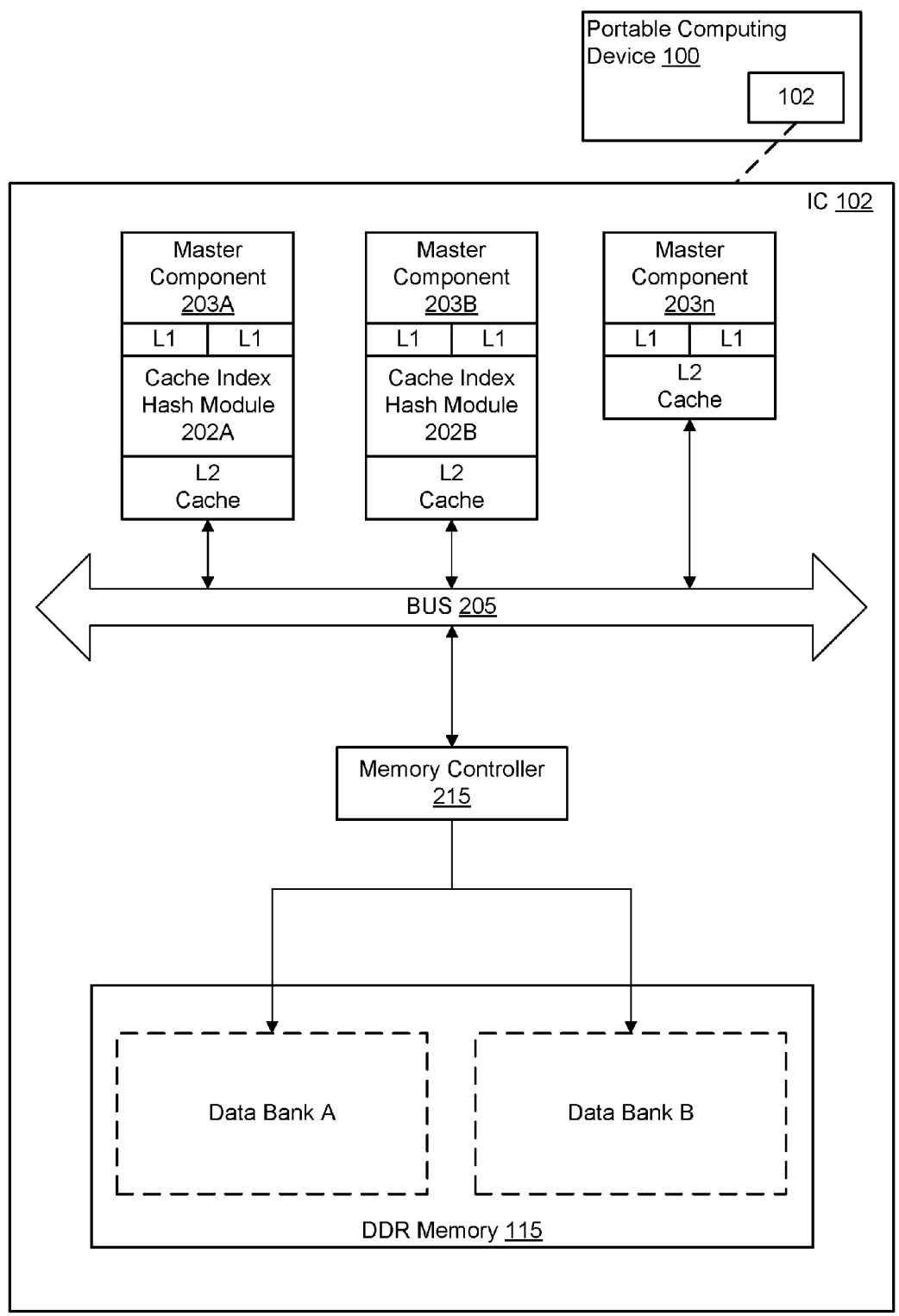
FIG. 4 is a functional block diagram illustrating an exemplary embodiment of an on-chip system for cache-level memory management ("CMM") of a memory subsystem.

In a particular aspect, one or more of the method steps described herein may be implemented by executable instructions and parameters stored in the memory subsystem 112 or as form the memory controller 215, the cache(s) and/or the cache index hash module(s) 202 (see FIG. 4). Further, the memory controller 215, the cache(s) and/or the cache index hash module(s) 202, the instructions stored therein, or a combination thereof may serve as a means for performing one or more of the method steps described herein.

Figure 2A:
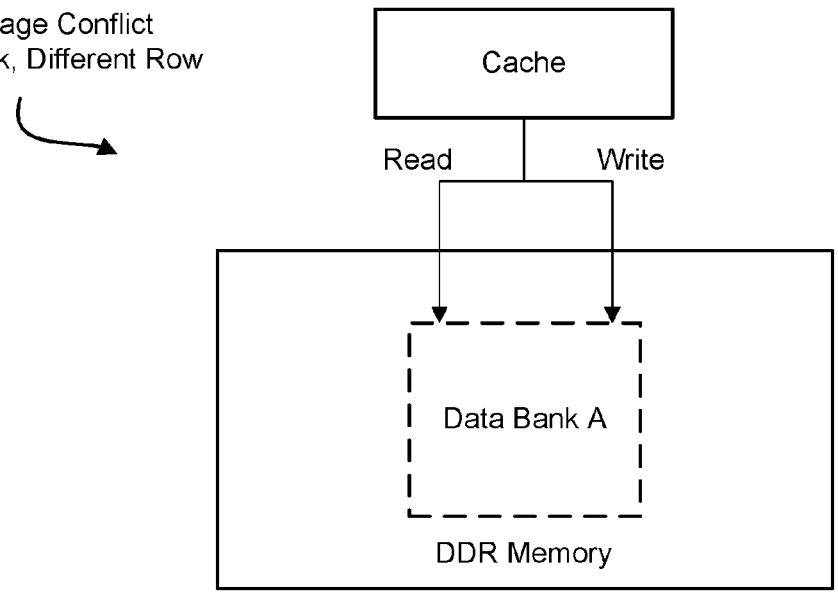
FIGS. 2A-2B are illustrations of read and write stream flows affecting DDR memory utilization.

FIG. 2 is an illustration of read and write stream flows affecting DDR memory utilization. The FIG. 2A illustration, specifically, depicts a pair of read and write transaction streams emanating from a cache associated with a master component, such as a CPU core, for example. The virtual memory addresses in the cache point to DDR memory addresses located in a Data Bank A and, as such, both transaction streams are competing for access to the same data bank. The DDR page conflict may cause unacceptable increases in transaction latencies, unnecessary power consumption, bus congestion, etc.

Figure 2B:
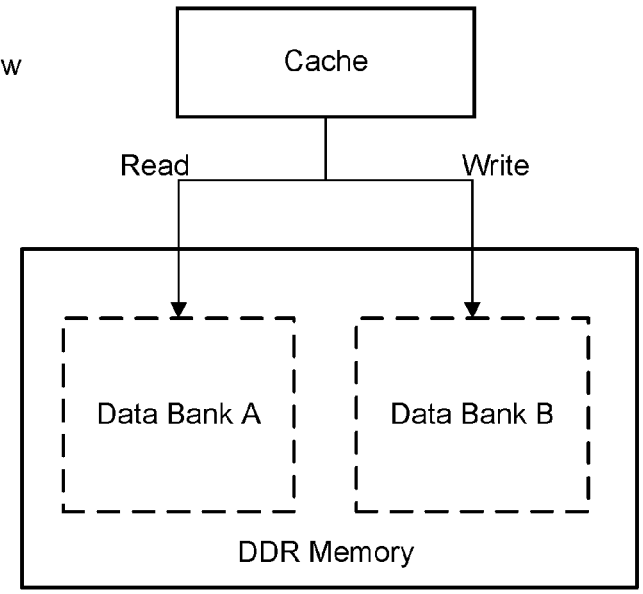

By contrast, the FIG. 2B illustration depicts the same pair of read and write transaction streams emanating from a cache associated with a master component. In the FIG. 2B illustration, however, the memory addresses associated with the read and write streams have been hashed such that the streams are directed to two different banks of the DDR, the read stream directed to Data Bank A and the write stream directed to Data Bank B. In this way, the transactions of both streams may be simultaneously serviced. As explained above, prior art solutions try to accomplish such hashing by employing a hash module at the memory controller, a method which often requires a validation step to make sure that each stream is eligible for hashing. Embodiments of a cache-level memory management solution, however, employ hashing functions at the cache-level so that each master component benefits from a hash methodology that is optimized for its particular needs. Also, because in a CMM solution the transaction streams emanating from the low level caches of master components are already hashed upon arrival at the memory controller, a validation step is unnecessary. The use of customized hashing algorithms at the cache level in order to dictate long term storage addresses in the DDR enables embodiments of a CMM solution to avoid DDR page conflicts which may result in relatively lower transaction latencies when compared to prior art approaches.

Figure 3:
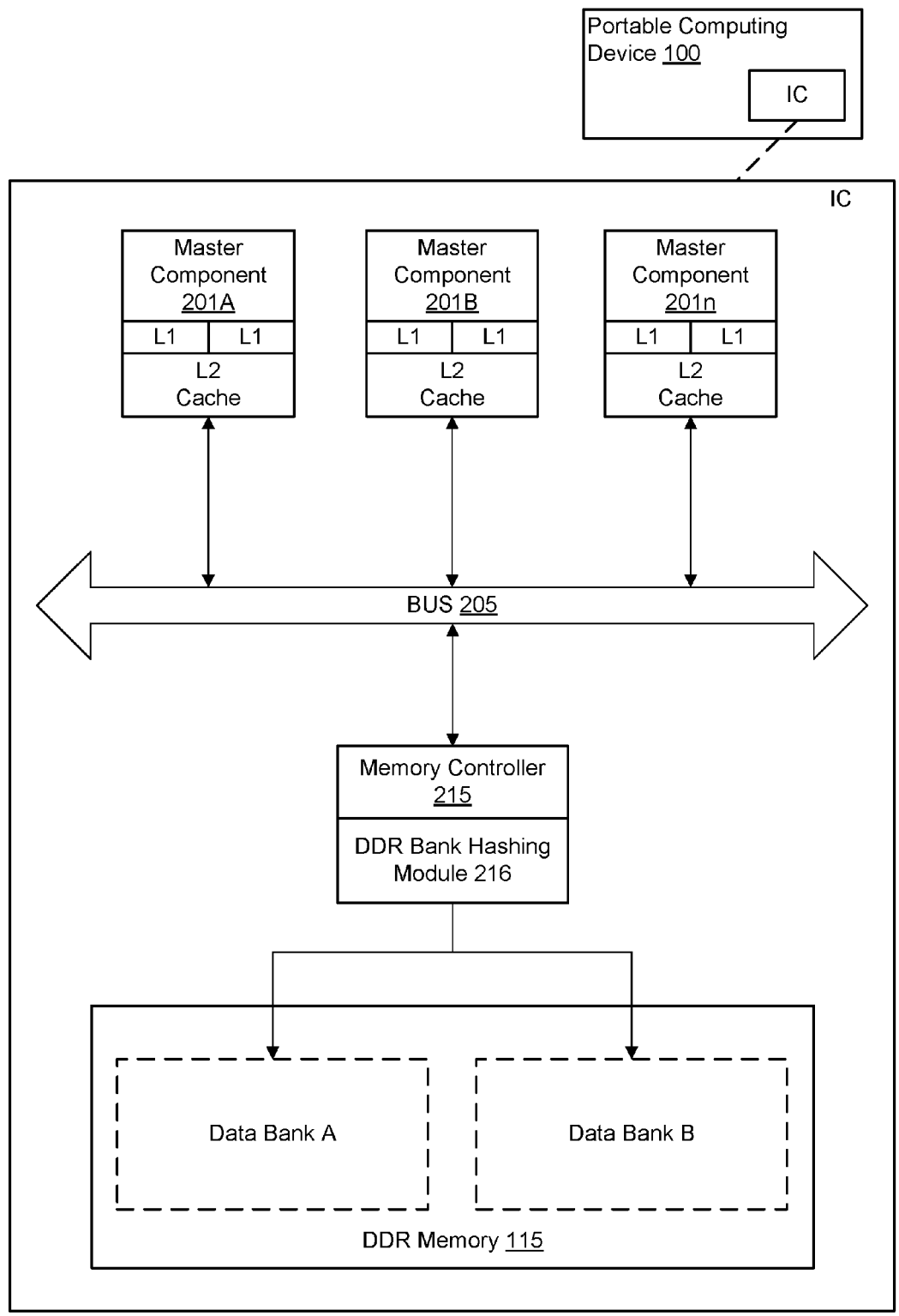
FIG. 3 is a functional block diagram illustrating a prior art system for memory management using a DDR bank hashing module.

FIG. 3 is a functional block diagram illustrating a prior art system for memory management using a DDR bank hashing module 216. In the FIG. 3 illustration, the master components 201 are processing workloads according to the demands of various application clients and, in doing so, are issuing read and write transactions to the DDR 115 via bus 205.

The transactions are marshaled by memory controller 215. Because the read and write transaction streams may be directed to memory addresses in the DDR 115 which are located in a common bank, the memory controller 215 utilizes DDR bank hashing module 216 to employ a single hashing algorithm, as would be understood by one of ordinary skill in the art. The purpose of the hashing step by the DDR bank hashing module 216 is to point the various transactions to memory addresses residing in different banks (e.g., data bank A and data bank B) of the DDR 115 to minimize page conflicts, but the nature of using one hashing algorithm for all transaction streams without regard for the master component from which a given stream was issued is that the hashing algorithm will inevitably be non-optimal for one or more of the master components. Further, because not all transaction streams are eligible for hashing (such as data streams emanating from a master component comprising hardware for generating a specific traffic pattern), validation of those streams must be taken into consideration during development so that hashing is bypassed. This step may come at a high cost to transaction latency, as the additional time to identify the validated transaction prior to hashing impacts the overall time required to fulfill the transaction. Moreover, the validation step may also come at a high cost to power consumption and bus congestion.

FIG. 4 is a functional block diagram illustrating an exemplary embodiment of an on-chip system 102 for cache-level memory management ("CMM") of a memory subsystem 112. In carrying out various workloads, master components 203 generate transaction requests for either updating or returning data and instructions stored in DDR 115. As would be understood by one of ordinary skill in the art, the transaction requests are directed over a bus 205 to a memory controller 215 that marshals the requests and manages the DDR 115 image.

Advantageously, the master components 203 may comprise a cache index hash module 202 (as illustrated with master components 203A, 203B) that works to hash the DDR memory locations for transaction streams emanating from the respective L2 caches. Because the cache index hashing modules 202A, 202B are respectively associated with given master components 203A, 203B, the particular hashing algorithms employed by the modules 202A, 202B may be customized and tuned for the particular needs and functionality of the associated master component 203. In this way, a CCM embodiment provides for the selection and provision of multiple hashing algorithms, each optimized for the transaction stream from the particular master component to which it is applied. Further, because not all master components require, or benefit from, the application of a hashing algorithm to its transaction streams, embodiments of a CCM solution provide for the ability to simply "turn off," or altogether decline the inclusion of, a cache index hash module (as illustrated with mater component 203n).

Regarding hashing algorithms that may be employed by a given cache index hashing module 202, it is envisioned that those of ordinary skill in the art may select hashing algorithms best suited for individual master components. And so, a CCM embodiment is not limited to the use of any particular hashing algorithm or hardware arrangement for employing a hashing algorithm. By way of example, though, and not limitation, it is envisioned that memory addresses may be hashed using a XOR gate, as would be understood by one of ordinary skill in the art. Assume, for example, that DDR bank bits are addressed as [15:13] and that a 1 MB L2 cache associated with a given master component includes a 64B line size. In this non-limiting example, a cache index hash module 202 may apply logic represented as:

$$L2\_cache\_index\_addr[15:13] = addr[19:17] \text{ XOR } addr[15:13]$$

Returning to the FIG. 4 illustration, DDR memory 115 is depicted to comprise two memory regions, a Data Bank A and a Data Bank B. The memory controller 215, which may comprise its own processor, receives the transaction requests generated by the master components 201 and already hashed using via the cache index hash module(s) 202. Because the transaction requests arrive at the memory controller already hashed, validation of the transaction source prior to hashing may be alleviated in embodiments of a CMM solution.

Advantageously, by "pre-hashing" transaction requests to the memory subsystem 112 at the cache level, CMM solutions may relieve congestion on the bus 205, improve average transaction latency, optimize memory capacity utilization and minimize power consumption across the SoC 102. Instead of using a single DDR bank hashing methodology, each application client in a CMM embodiment benefits from its master components having a dedicated, customized cache index hashing module 202 which may be tuned based on the master component's unique traffic pattern and cache organization. In this way, a CMM embodiment may deliver an overall memory performance that is optimized. Additionally, CMM embodiments provide an option for certain master components to opt out of hashing, such as those application clients and master components that employ dedicated hardware to generate specific traffic patterns that should not be changed.

Figure 5:
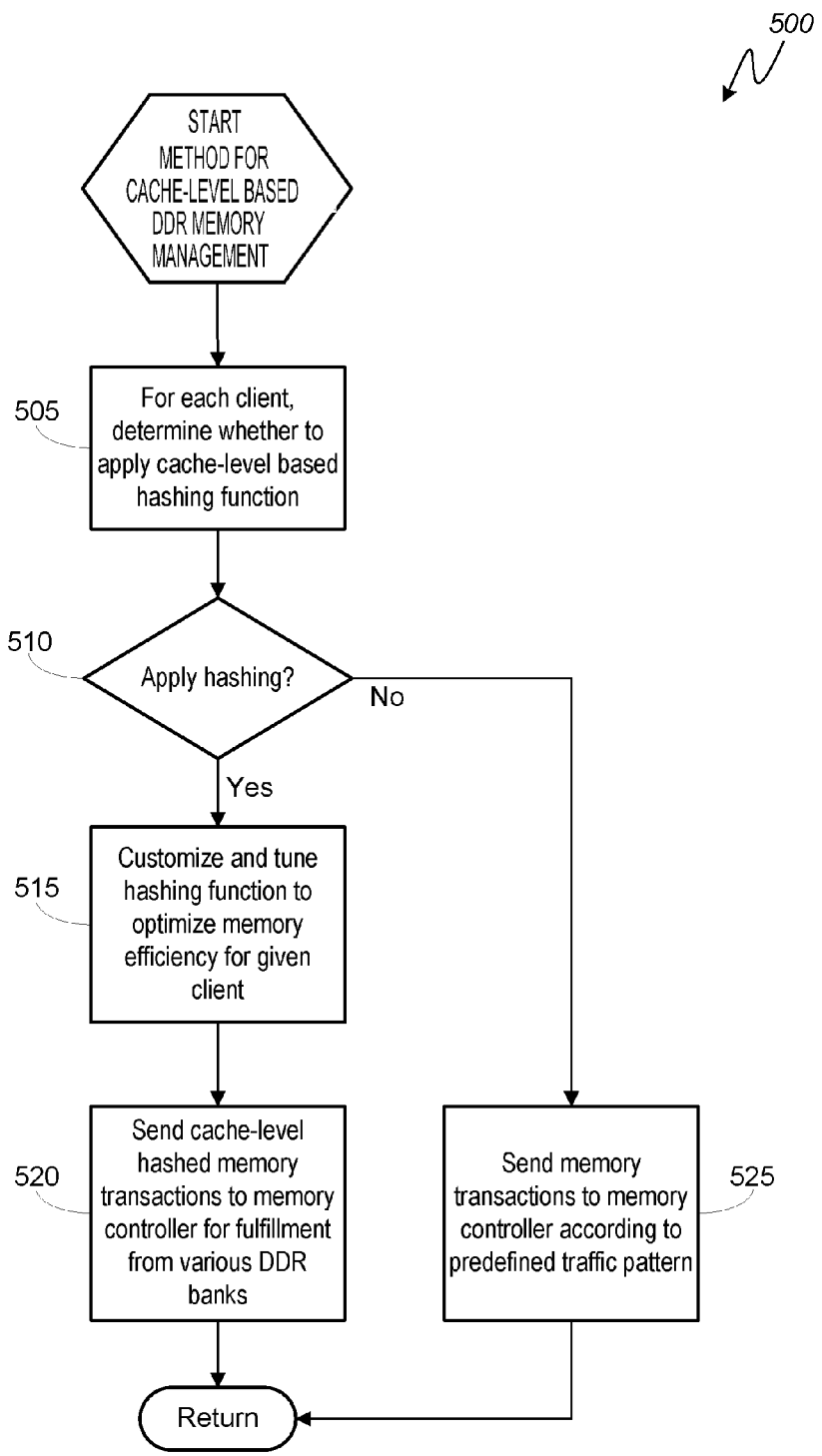
FIG. 5 is a logical flowchart illustrating an exemplary method for cache-level memory management ("CMM") according to the solution.

FIG. 5 is a logical flowchart illustrating an exemplary method 500 for cache-level memory management ("CMM") according to an embodiment of the solution. Beginning at block 505, for each application client and/or master processing component, the method determines whether the transaction traffic should be hashed. For those components not requiring or benefitting from hashing, the "no" branch is followed from decision block 510 to block 525. At block 525, any transaction streams associated with those components not requiring or benefitting from hashed memory addresses are transmitted to the memory controller unhashed. The memory controller receives the transactions and fulfills them from the DDR, as would be understood by one of ordinary skill in the art.

Returning to decision block 510, if a client application and/or master processing component is eligible for having the memory addresses identified in its transaction streams hashed, the method 500 follows the "yes" branch from decision block 510 to block 515. At block 515, a cache index hash module 202 is customized with a hashing algorithm that is optimal for the given client and/or master component. The customized hashing algorithm is applied to the memory addresses identified in the various transaction streams such that, when forwarded to a memory controller at block 520, the DDR memory addresses identified in the transactions are likely to reside in differing DDR banks. In this way, embodiments of CMM solutions minimize page conflicts at the DDR, optimize cache usage for each given client, reduce transaction latencies, and avoid unnecessary validation steps which consume power and contribute to bus congestion. The method 500 returns.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices or software instruction and data structures is not considered necessary for an adequate understanding of how to make and use the invention. The inventive functionality of the claimed computer implemented processes is explained in more detail in the above description and in conjunction with the drawings, which may illustrate various process flows.

In one or more exemplary embodiments, the functions described may be implemented in hardware, software, firmware, or any combination thereof. If implemented in software, the functions may be stored on or transmitted as one or more instructions or code on a computer-readable device. Computer-readable devices include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for cache-level memory management in a system on a chip ("SoC"), the method comprising:
   for each of one or more clients, determining eligibility for hashing transaction traffic;
   for each of the one or more clients that is determined to be eligible for hashing transaction traffic, selecting a customized hashing algorithm;
   for each of the one or more clients that is determined to be eligible for hashing transaction traffic, applying its customized hashing algorithm to read and write transactions associated with a low level cache; and
   for each of the one or more clients determined to be eligible for hashing transaction traffic, directing hashed read and write transactions from the low level cache to a memory controller associated with a multi-bank memory device accessible by all of the one or more clients, wherein the hashed read and write transactions are fulfilled from different banks of the multi-bank memory device.

2. The method of claim 1, wherein the low level cache is a second level ("L2") cache.

3. The method of claim 1, wherein the multi-bank memory device is a dynamic random access memory ("DRAM") component.

4. The method of claim 3, wherein the DRAM component is a double data rate ("DDR") memory device.

5. The method of claim 1, further comprising:
for each of the one or more clients that is determined to be ineligible for hashing transaction traffic, directing its unhashed read and write transactions from the low level cache to the memory controller associated with the multi-bank memory device.

6. The method of claim 1, wherein two or more clients are determined to be eligible for hashing transaction traffic and at least two of the customized hashing algorithms differ.

7. The method of claim 1, wherein the SoC is part of a portable computing device.

8. The method of claim 7, wherein the portable computing device comprises at least one of a mobile telephone, a personal digital assistant, a pager, a smartphone, a navigation device, and a hand-held computer with a wireless connection or link.

9. A system for cache-level memory management in a system on a chip ("SoC"), the system comprising:
for each of one or more clients, means for determining eligibility for hashing transaction traffic;
for each of the one or more clients that is determined to be eligible for hashing transaction traffic, means for selecting a customized hashing algorithm;
for each of the one or more clients that is determined to be eligible for hashing transaction traffic, means for applying its customized hashing algorithm to read and write transactions associated with a low level cache; and
for each of the one or more clients determined to be eligible for hashing transaction traffic, means for directing hashed read and write transactions from the low level cache to a memory controller associated with a multi-bank memory device accessible by all of the one or more clients, wherein the hashed read and write transactions are fulfilled from different banks of the multi-bank memory device.

10. The system of claim 9, wherein the low level cache is a second level ("L2") cache.

11. The system of claim 9, wherein the multi-bank memory device is a dynamic random access memory ("DRAM") component.

12. The system of claim 11, wherein the DRAM component is a double data rate ("DDR") memory device.

13. The system of claim 9, further comprising:
for each of the one or more clients that is determined to be ineligible for hashing transaction traffic, means for directing its unhashed read and write transactions from the low level cache to the memory controller associated with the multi-bank memory device.

14. The system of claim 9, wherein two or more clients are determined to be eligible for hashing transaction traffic and at least two of the customized hashing algorithms differ.

15. The system of claim 9, wherein the SoC is part of a portable computing device.

16. The system of claim 15, wherein the portable computing device comprises at least one of a mobile telephone, a personal digital assistant, a pager, a smartphone, a navigation device, and a hand-held computer with a wireless connection or link.

17. A system for cache-level memory management in a system on a chip ("SoC"), the system comprising:
one or more cache index hash modules operable to:
select a customized hashing algorithm;
apply the customized hashing algorithm to read and write transactions associated with a low level cache; and
direct hashed read and write transactions from the low level cache to a memory controller associated with a multi-bank memory device accessible by a plurality of clients, wherein the hashed read and write transactions are fulfilled from different banks of the multi-bank memory device.

18. The system of claim 17, wherein the low level cache is a second level ("L2") cache.

19. The system of claim 17, wherein the multi-bank memory device is a dynamic random access memory ("DRAM") component.

20. The system of claim 19, wherein the DRAM component is a double data rate ("DDR") memory device.

21. The system of claim 19, wherein two or more of the cache index hash modules apply different customized hashing algorithms.

22. The system of claim 19, wherein the SoC is part of a portable computing device.

23. The system of claim 22, wherein the portable computing device comprises at least one of a mobile telephone, a personal digital assistant, a pager, a smartphone, a navigation device, and a hand-held computer with a wireless connection or link.

24. A computer program product comprising a non-transitory computer usable device having a computer readable program code embodied therein, said computer readable program code adapted to be executed to implement a method for cache-level memory management in a system on a chip ("SoC"), said method comprising:
for each of one or more clients, determining eligibility for hashing transaction traffic;
for each of the one or more clients that is determined to be eligible for hashing transaction traffic, selecting a customized hashing algorithm;
for each of the one or more clients that is determined to be eligible for hashing transaction traffic, applying its customized hashing algorithm to read and write transactions associated with a low level cache; and
for each of the one or more clients determined to be eligible for hashing transaction traffic, directing hashed read and write transactions from the low level cache to a memory controller associated with a multi-bank memory device accessible by all of the one or more clients, wherein the hashed read and write transactions are fulfilled from different banks of the multi-bank memory device.

25. The computer program product of claim 24, wherein the low level cache is a second level ("L2") cache.

26. The computer program product of claim 24, wherein the multi-bank memory device is a dynamic random access memory ("DRAM") component.

27. The computer program product of claim 26, wherein the DRAM component is a double data rate ("DDR") memory device.

28. The computer program product of claim 24, further comprising:
for each of the one or more clients that is determined to be ineligible for hashing transaction traffic, directing its unhashed read and write transactions from the low level cache to the memory controller associated with the multi-bank memory device.

29. The computer program product of claim 24, wherein two or more clients are determined to be eligible for hashing transaction traffic and at least two of the customized hashing algorithms differ.

30. The computer program product of claim 24, wherein the SoC is part of a portable computing device.

* * * * *